United States Patent [19]

Soma et al.

[11] Patent Number: 4,767,730
[45] Date of Patent: Aug. 30, 1988

[54] CERAMIC SHAPE MEMORY ELEMENT

[75] Inventors: Takao Soma; Minoru Matsui, both of Nagoya, Japan

[73] Assignee: NGK Insulators, Ltd., Nagoya, Japan

[21] Appl. No.: 910,257

[22] Filed: Sep. 19, 1986

Related U.S. Application Data

[63] Continuation of Ser. No. 631,103, Jul. 16, 1984, abandoned.

[30] Foreign Application Priority Data

Jul. 21, 1983 [JP] Japan ............................... 58-131818

[51] Int. Cl.$^4$ ............................................. C04B 35/48
[52] U.S. Cl. .................................................. 501/103
[58] Field of Search ................ 264/229, 230; 501/103, 501/104, 152; 148/402

[56] References Cited

U.S. PATENT DOCUMENTS

| | | | |
|---|---|---|---|
| 3,861,947 | 1/1975 | Hamling | 501/103 |
| 4,035,191 | 7/1977 | Johns | 501/103 |
| 4,309,807 | 1/1982 | Hill et al. | 264/230 |
| 4,360,598 | 11/1982 | Otagiri et al. | 501/103 |
| 4,421,861 | 12/1983 | Claussen et al. | 501/103 |
| 4,506,024 | 3/1985 | Claussen et al. | 501/103 |
| 4,664,056 | 5/1987 | Jehanno | 116/217 |

FOREIGN PATENT DOCUMENTS

2634149  2/1978  Fed. Rep. of Germany ...... 501/104
58-32065  2/1983  Japan ................................ 501/104

OTHER PUBLICATIONS

Matsui et al., J. Amer. Ceram. Soc., vol. 69, #3, (1986), pp. 198–202.
Advances in Ceramics, vol. 12, pp. 371–381, (1984).
Gupta et al., J. Materials Sci., vol. 13, pp. 1464–1470, (1978).
Advances in Ceramics, vol. 3, pp. 116–136, (1981).
Proc. of First Int'l. Symp. on Ceramic Components for Engines, pp. 660–671, (1984).
Swain, Nature, vol. 322, pp. 234–236, (Jul. 17, 1986).

*Primary Examiner*—Steven Capella
*Attorney, Agent, or Firm*—Parkhurst & Oliff

[57] ABSTRACT

Disclosed herein is a ceramic shape memory element containing zirconia. A ceramic article is also disclosed which contains at least one of tetragonal zirconia and monoclinic zirconia, and is subjected to plastic deformation through phase transformation caused by maintaining the article at a given temperature, and/or imposing a given stress thereupon. Methods of processing and joining the ceramic article by utilizing the shape memory phenomenon peculiar to such a ceramic article are also disclosed.

17 Claims, 4 Drawing Sheets

FIG_1a

FIG_1b

FIG_2

FIG_3

FIG_4

FIG_5

FIG_6

FIG_7a

FIG_7b

FIG_8a

FIG_8b

FIG_9a

FIG_9b

FIG_9c

CERAMIC SHAPE MEMORY ELEMENT

This is a continuation of application Ser. No. 631,103, filed July 16, 1984, now abandoned.

BACKGROUND OF THE INVENTION (1) Field of the Invention:

The present invention relates to ceramic articles having a shape memory effect, and a processing method and a joining method using such a shape memory ceramic article.

(2) Description of the Prior Art:

Although ceramics such as alumina, silicon nitride or the like have excellent properties in heat resistance, corrosion resistance, wear resistance, and mechanical strength, they cannot be worked through a cheap and easy plastic processing which is ordinarily carried out in the case of the metals, because the ceramics indicate no plastic deformation at room temperature or a temperature therearound. Therefore, the ceramics are processed by cutting, grinding, or polishing, and it is very difficult to precisely process them or process them into a complicated profile. Accordingly, there have been demanded ceramic articles which can be plastically processed at room temperature or a temperature therearound.

Incidentally, there are materials such as Ni-Ti alloy which have a peculiar physical property called "shape memory". The shape memory is a phenomenon which is attributable to a martensite transformation, that is, the transformation due to the shear deformation of the crystal lattice, and means that shape-restoring phenomenon occurs in a one way direction or reversibly between the shape on a higher temperature side and the shape on a lower temperature side across a transformation temperature range. Besides the Ni-Ti alloy, there are Cu-Cd alloy, Cu-Zn alloy, Cu-A-Ni alloy, Cu-Sn alloy and so on as the materials having the shape memory effect, but they are all metallic. The metals are not suitable for use under a high temperature oxidizing atmosphere and a corrosive atmosphere. Thus, there have been strongly desired ceramic materials which have excellent properties in heat resistance, corrosion resistance, wear resistance, and mechanical strength as well as shape memory effect.

SUMMARY OF THE INVENTION

It is therefore an object of the present invention to provide a shape memory ceramic article.

It is another object of the invention to provide a method of easily processing a ceramic article at room temperature or a temperature therearound.

It is still another object of the invention to provide a method of easily joining a ceramic article with another member at room temperature or a temperature therearound.

According to the present invention, the ceramic article contains zirconia, and has a shape memory effect.

According to another aspect of the invention, there is a provision of a ceramic article which contains at least one of tetragonal zirconia and monoclinic zirconia, and in which the phase transformation between the tetragonal phase and the monoclinic phase is brought about by maintaining the ceramic article at a given temperature and/or imposing a given stress thereupon to cause plastic deformation thereof.

According to a further aspect of the invention, there is a provision of a method of processing a ceramic article in which a ceramic article containing at least one of tetragonal zirconia and monoclinic zirconia is contacted with another member having an arbitrary shape under pressure, or such a contacted body is kept at a given temperature, to cause phase transformation between the tetragonal phase and the monoclinic phase, whereby plastic deformation is induced.

According to a still further aspect of the invention, there is a provision of a method of joining a ceramic article in which a ceramic article containing at least one of tetragonal zirconia and monoclinic zirconia is contacted with another member so as to fit the ceramic article in another member under pressure and/or while maintaining the contacted body at a given temperature, to cause the phase transformation, whereby the plastic deformation is induced.

According to a still further aspect of the invention, there is a provision of a method of joining a ceramic article in which a ceramic article containing at least one of tetragonal zirconia and monoclinic zirconia is maintained at a given temperature, and/or applied to a given stress to cause the phase transformation between the tetragonal phase and the monoclinic phase, whereby the ceramic article is plastically deformed, and then such a deformed ceramic article is fitted to another member and kept at a given temperature to restore the ceramic article to the original shape before the plastic deformation.

These and other objects, features and advantages of the invention will be well appreciated when taken in conjunction with the attached drawings with understanding that some modifications, variations, and changes of the invention could be easily made by the skilled in the art to which the invention pertains without departing from the spirit of the invention or the scope of the claims appended hereto.

DESCRIPTION OF THE PREFERRED EMBODIMENTS

In the following, the construction of the present invention will be described in detail.

The present invention relates to a ceramic shape memory element containing zirconia. Further, the invention relates to a ceramic article containing at least one of tetragonal zirconia and monoclinic zirconia, and plastically deformed through a phase transformation between the tetragonal phase and the monoclinic phase by maintaining the ceramic article at a given temperature and/or by imposing a given stress thereupon. Moreover, the invention relates to a ceramic article containing at least one of tetragonal zirconia and monoclinic zirconia, and plastically deformed through a phase transformation between the tetragonal phase and the monoclinic phase by maintaining the ceramic article at a given temperature and/or by imposing a given stress thereupon, which is restored toward the original shape before the plastic deformation by maintaining the ceramic article again at a given temperature and/or by imposing a specified stress thereupon. The content of the zirconia in the ceramic article of the invention is preferably not less than 5% by weight, more preferably not less than 50% by weight. The temperature range which gives rise to the plastic deformation is preferably $-270°$ C. to $800°$ C., more preferably $0°$ C. to $300°$ C. The range of the stress under load giving the plastic deformation is preferably 5 MPa to 10,000 MPa, more preferably 50 MPa to 3,000 MPa. It is most preferable that the ceramic article is plastically deformed by imposing a stress of 50 MPa to 3,000 MPa thereupon while being kept at a temperature of $0°$ C. to $3,000°$ C. The restoring temperature range at which the ceramic article is restored toward its original shape before the plastic deformation is preferably $0°$ C. to $1,400°$ C., more preferably $400°$ C. to $1,400°$ C. The restoring stress range under load at which the ceramic article is restored toward the original shape before the plastic deformation is 5 MPa to 10,000 MPa, more preferably 50 MPa to 3,000 MPa. Further, it is most preferable that the stress of $50\sim3,000$ MPa is imposed upon the ceramic article while maintaining a temperature at $400°$ C. to $1,400°$ C.

The present invention also relates to a method of processing a ceramic article in which the ceramic article containing at least one of tetragonal zirconia and monoclinic zirconia is contacted with a member having an arbitrary shape under pressure or additionally, while keeping said contacted state at a given temperature, to cause the phase transformation between the tetragonal phase and the monoclinic phase and to induce the plastic deformation. Still further, the invention relates to a method of joining a ceramic article in which the ceramic article containing at least one of tetragonal zirconia and monoclinic zirconia is contacted with another member so as to fit the ceramic article to another member under pressure or while maintaining the temperature at a given temperature, to cause the phase transformation between the tetragonal phase and the monoclinic phase and to induce the plastic deformation. The present invention further relates to a method of joining a ceramic article in which the ceramic article containing at least one of tetragonal zirconia and monoclinic zirconia is maintained at a given temperature and/or imposing a given stress thereupon to cause phase transformation between the tetragonal phase and the monoclinic phase and to induce plastic deformation, the thus deformed ceramic article is fitted to another member, and the fitted ceramic article is kept at a given temperature to restore the ceramic article toward the original shape before the plastic deformation.

The present inventors have found that zirconia may cause plastic deformation without breaking zirconia under an appropriate temperature and an appropriate stress by utilizing the property that the phase transformation between the tetragonal phase and the monoclinic phase of zirconia is the martensite transformation, and that the original shape of zirconia can be restored by keeping zirconia at an appropriate temperature. The present invention is based on the discovery of the plastic deformation and the shape-restoring phenomenon of zirconia.

In the following description, the terms "tetragonal phase" and "monoclinic phase" mean the tetragonal phase and the monoclinic phase of zirconia, respectively.

The phase transformation between the tetragonal phase and the monoclinic phase depends upon the temperature, and is accelerated by an applied stress and water in the atmosphere. Since there is about 5% difference in volume between the tetragonal phase and the monoclinic phase, the phase transformation therebetween is accompanied by expansion or shrinkage. Therefore, when the ceramic article containing at least one of tetragonal zirconia and monoclinic zirconia is maintained at a temperature at which the tetragonal phase or the monoclinic phase is present in a metastable state, the martensite transformation from the metastable phase to the stable phase is caused to bring about the plastic deformation of the ceramic article. Since the phase transformation between the tetragonal phase and the monoclinic phase is induced by the applied stress, when an appropriate stress is imposed upon the ceramic article containing at least one of tetragonal zirconia and monoclinic zirconia, the ceramic article is plastically deformed after the elastic deformation without being broken. It is possible to more easily bring about the plastic deformation by imposing an appropriate applied stress while being kept at a temperature at which the phase transformation easily proceeds. Further, since the phase transformation is accelerated by water in the atmosphere, the phase transformation rate can be accelerated by increasing the concentration of the water in the atmosphere to facilitate the plastic deformation.

When the ceramic article, plastically deformed through the phase transformation from the tetragonal phase to the monoclinic phase, is maintained at a temperature at which the tetragonal phase is stable, the monoclinic phase is transformed to the previous tetragonal phase to restore the ceramic article toward its original shape before the plastic deformation. Similarly, when the ceramic article, plastically deformed through the phase transformation from the monoclinic phase to the tetragonal phase, is maintained at a temperature at which the monoclinic phase is stably present, the ceramic article is restored toward its original shape before the plastic deformation. Further, when a stress in a reverse direction is applied to the ceramic article once plastically deformed, a transformation reverse to the transformation caused upon the initial plastic deformation occurs and the original shape of the ceramic article can be restored.

Next, the reasons for restriction on the figure range in the present invention will be described below.

The reasons why the temperature range giving rise to the plastic deformation is in a range of −270° C. to 800° C. is that it is difficult to hold a ceramic article at a temperature lower than −270° C., while when the temperature is higher than 800° C., the rate of the martensite transformation is extremely slow and not practical. The reason why 0° C. to 300° C. is preferred is that in this temperature range, the phase transformation rate is fast and the effect of the phase transformation influencing upon the plastic deformation can be effectively utilized and the treatment can be easily effected in a commercially available dryer.

The reason why the stress range under load causing the plastic deformation is set at 5 MPa to 10,000 MPa is that when it is less than 5 MPa, it is difficult to induce a martensite transformation enough to cause the plastic deformation, while when the stress is more than 10,000 MPa, there is a fear that the ceramic article is broken. The reason why the stress is preferably 50 MPa to 3,000 MPa is that the phase transformation rate can be controlled in a practical range.

When a stress of 50 MPa to 3,000 MPa is imposed under the condition where the temperature is kept at 300° C., the temperature and stress are synergistically acted upon the phase transformation to swiftly cause an appropriate plastic deformation upon the ceramic article.

The reason why the temperature range at which the ceramic article is restored toward the original shape before the plastic deformation is 0° C. to 1,400° C., is that when the temperature is lower than 0° C. or higher than 1,400° C., it is difficult to obtain enough of the phase transformation to restore the original shape before plastic deformation. The reason for the preferable temperature range of 400° to 1,400° C. is that in this temperature range, the phase transformation for restoring the original shape is likely to occur and the shape-restoring phenomenon can be easily obtained.

The reason why the stress range under load at which the ceramic article is restored to the original shape before plastic deformation, is 5 MPa to 10,000 MPa is that when the stress is lower than 5 MPa, it is difficult to induce the phase transformation enough to cause the shape-restoring phenomenon, while when the stress is higher than 10,000 MPa, there is a fear that the ceramic article might break. The reason why the stress is preferred to be 50 MPa to 3,000 MPa is that the phase transformation rate can be controlled in a practical range.

When the stress of 50 MPa to 3,000 MPa is imposed upon the ceramic article while the temperature is kept at 400° C. to 1,400° C., the effects of the temperature and the stress are synergistically acted upon the phase transformation to swiftly cause the shape-restoring phenomenon of the ceramic article.

Further, in order to accelerate the phase transformation rate by the water contained in the atmosphere to attain a practical phase transformation rate, the water content must be not less than 0.08 g/l and a more practical phase transformation rate can be obtained in the case of the water content being not lower than 2.5 g/l.

Since the phenomena of the plastic deformation and the shape restoration are caused by the phase transformation between the tetragonal phase and the monoclinic phase, it is difficult to obtain an effective plastic deformation and shape restoring phenomena if the content of zirconia in the ceramic article is not higher than 5%. Moreover, in order to more effectively develop the plastic deformation and shape restoring phenomena and to develop the zirconia inherent properties such as excellent heat resistance, corrosion resistance, mechanical strength, and the like, the content of zirconia is preferred to be not lower than 50% by weight.

Figure 1A:
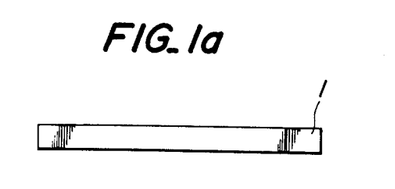
FIGS. 1a and 1b are plan and front views of a ceramic article according to the present invention, respectively.
Figure 1B:
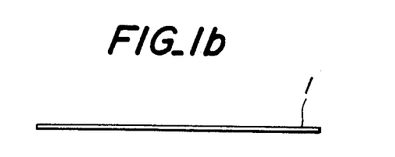
Figure 2:
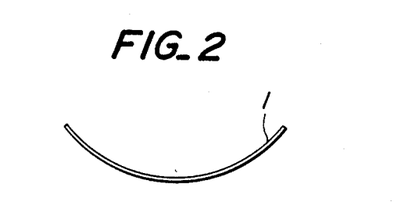
FIG. 2 is a front view of the ceramic article as plastically deformed.

For instance, as shown in FIGS. 1a and 1b, when a bending stress is imposed at 200° C. upon a zirconia sheet 1 containing a solid solution of 5.4% by weight of yttrium, the sheet is plastically deformed after elastic deformation into a bending strain of about 1% as shown in FIG. 2 without being broken. When the bent sheet is heated up to 800° C., it restores the shape substantially in the state as shown in FIG. 1b. As to alumina and silicon nitride, samples each having a similar shape were prepared therefrom. As a result, it was discovered that the samples were broken immediately after the elastic deformation at a temperature of not higher than 1,000° C., and no plastic deformation was observed, while when the temperature was not lower than 1,000° C., only creep deformation, which is caused by the substance transfer observed in the ordinary ceramics, was observed. The plastic deformation strain caused by such a creep deformation was not removed even when heating-cooling were repeated.

The ceramic articles according to the present invention may be produced, for instance, by the following method.

That is, yttria, calcia, magnesia, ceria, hafnia, titania or the like is mixed with powdery zirconia having a crystalline particle size of not larger than 1,000 Å or amorphous form to obtain a powdery mixture, which is preliminary shaped into a desired shape according to a hydraulic pressure method, an extrusion molding method, a sludge casting method or the like, followed by processing and firing at 1,000°–2,200° C. The thus obtained fired article is finally worked by a laser, a diamond wheel or the like to cut, grind and polish it into a desired shape. The plastic deformation temperature and the shape restoring temperature of the ceramic article may be widely varied by selecting the amount and the kind of the oxides to be added to the zirconia, such as yttria, calcia, magnesia, ceria, hafnia, titania and so on.

The ceramic article according to the present invention can be also used as, for instance, a sensor in the heat safety device. The deformed ceramic article, for instance, a bent sheet restores its original shape, a straight shape in FIGS. 1-3, when it exceeds a peculiar temperature, so that, it can actuate a relay device. Since the temperature range of the phase deformation between the tetragonal phase and the monoclinic phase of the ceramic article according to the present invention can be varied by selecting the kind and the amount of the oxide to be added to zirconia, the sensor-actuating temperature limit may be arbitrarily controlled to a desired temperature.

Further, the ceramic article according to the present invention may be used as a washer, a valve and a connection member which are to be used in a high temperature oxidizing atmosphere or a corrosive atmosphere in which a metallic shape memory element cannot be used. In addition, the ceramic article in the present invention means a material in which a mother phase into which zirconia is dispersed is ceramic, but a similar effect may be obtained in the case of, for example, an article in which zirconia of the tetragonal phase and/or the monoclinic phase is dispersed into a mother material of a metal or a plastic Now, a method of processing the ceramic article according to the present invention will be described more in detail.

According to the processing method of the invention, the ceramic article containing at least one of tetragonal zirconia and monoclinic zirconia is brought into contact with another member having an arbitrary shape under pressure, or brought into contact therewith under pressure while they are maintained at a given temperature, so that the phase transformation between the tetragonal phase and the monoclinic phase is induced to make the plastic deformation.

This process may be carried out, for instance, by the following:

The ceramic article containing tetragonal zirconia and/or monoclinic zirconia is pressed to a given shaped mold made of a metal or ceramic at room temperature or a temperature of not higher than 300° C. The phase transformation from the tetragonal phase to the monoclinic phase is caused by the stress imposed upon the ceramic article through press and the ceramic article is plastically processed into a desired shape. The method of the present invention can easily process the ceramic article which is a brittle material.

Further, explanation will be made on an example where the method according to the present invention is applied for bending a plate sheet.

For instance, a plate-like ceramic article is prepared by using zirconia containing a solid solution of 5.4% by weight of yttria. The ceramic article thus obtained is placed between a pair of concave and convex molds having a given warp and pressed at 200° C. The ceramic article is plastically deformed warping along the shape of the molds through the phase transformation.

According to the method of the invention, in order to fit the ceramic article containing at least one of tetragonal zirconia and monoclinic zirconia to another member, the transformation between the tetragonal phase and the monoclinic phase is caused by bringing them into contact with each other under pressure and/or keeping them at a given temperature, so as to induce the plastic deformation.

Next, the joining method of the ceramic article according to the present invention will be explained in more detail.

According to the joining method of the invention, a joining member of a desired shape is prepared from the ceramic article containing at least one of tetragonal zirconia and monoclinic zirconia, and is fitted to a member to be joined. Then, a stress is imposed upon the joining member to cause the phase transformation, thereby carrying out joining.

Then, explanation will be made on a case where the joining method according to the invention is applied to a rivet for joining two plates together. For instance, a rivet with a bore is prepared by using a zirconia containing a solid solution of 5.4% by weight of yttria, and is inserted into given holes of the plates, and a conical member is inserted into the bore of the rivet from the lower end portion, and the stress is imposed from both the upper side and the lower side. The portion of the rivet which is pressed by the conical member is plastically deformed by the transformation induced by the stress, and the two plates are joined together.

Next, another joining method according to the present invention will be explained in a greater detail with reference to the ceramic article of the invention.

This relates to a joining method in which a ceramic article containing at least one of tetragonal zirconia and monoclinic zirconia is maintained at a given temperature, and/or subjected to a given stress to cause the phase transformation between the tetragonal phase and the monoclinic phase, and is plastically deformed. The thus deformed ceramic article is fitted to another member, and then the ceramic article, is kept at a given temperature to restore the ceramic article to its original shape before plastic deformation.

This joining method may be carried out, for instance, in the following member. A desired joining member is prepared from a ceramic article containing at least one of tetragonal zirconia and monoclinic zirconia, and a given stress is imposed upon the joining member while it is kept at a given temperature, so that the phase transformation between the tetragonal phase and the monoclinic phase of the zirconia results to produce a desired plastic strain of the joining member. Then, after the joining member is fitted to members to be joined, which are made of a metal or ceramic, the ceramic article is heated to a given temperature, so that the joining member is restored toward the original shape before the plastic deformation, thereby effecting the joining.

Figure 3:
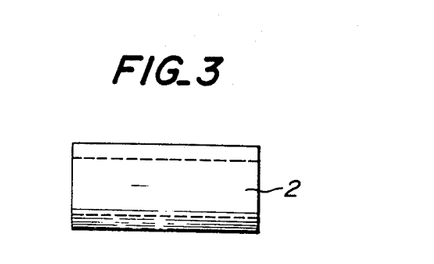
FIG. 3 is a front view of a tubular joint using a ceramic article according to the invention.
Figure 4:
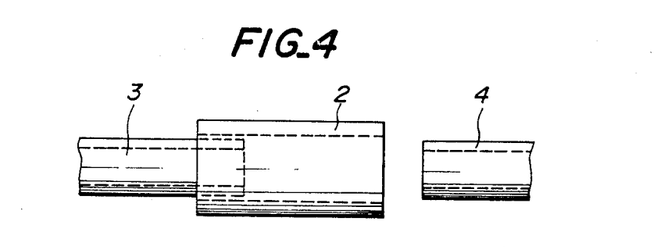
FIG. 4 is a front view of the plastically deformed tubular joint to which tubes are inserted from the opposite ends thereof.
Figure 5:
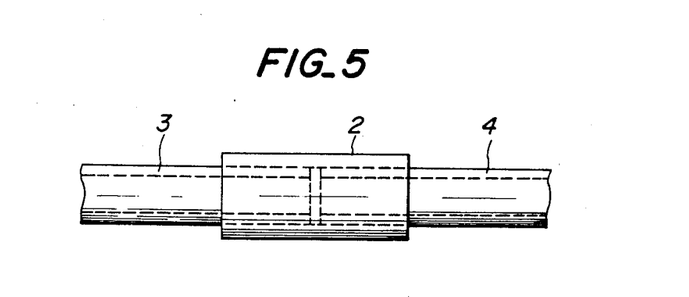
FIG. 5 is a front view where the tubular joint is heated and restored toward the original shape to join the two tubes with the tubular joint.

Next, a detailed explanation will be made on a case where the present invention is applied to the joining of tubes. First, a tubular joint 2 as shown in FIG. 3 is prepared from the ceramic containing at least one of tetragonal zirconia and monoclinic zirconia, and a stress is hydraulically imposed upon the interior of the joining member at a temperature lower than the phase transformation temperature from the tetragonal phase to the monoclinic phase to cause plastic deformation of the tubular joint 2, thereby enlarging the inner diameter of the tube 2 slightly larger than before as shown in FIG. 4. Tubes 3 and 4 each having an outer diameter slightly larger than the inner diameter of the tubular joint 2 before the plastic deformation are inserted into the tubular joint 2 from the opposite ends thereof, and then heating is effected at a temperature higher than the phase transformation temperature, whereby the tubular joint 2 restores its shape near the original one thereof to easily join the tubes 3 and 4 together by the tubular joint 2 as shown in FIG. 5. The present invention is applicable to the joining of another object having an arbitrary shape other than the tubular form, and no restriction is required to be posed upon the material to be joined together.

The invention will be explained more in detail below with reference to the following examples, which are merely illustrative of the invention, but should not be interpreted to limit the invention.

EXAMPLE 1

2 parts by weight of alumina silicate was added to 100 parts by weight of a mixture of zirconia powder and yttria powder being 94.6% by weight and 5.4% by weight respectively, and the mixture was then subjected to mixing and pulverization for 50 hours in a pot mill, followed by drying, to obtain a raw material powder. After this powder was shaped into a prism of 60 mm×60 mm×300 mm in a press mold, a hydrostatic pressure of 1,000 kg/cm² was imposed thereupon. This shaped article was fired in an electric furnace at 1,400° C. for 3 hours. The chemical composition of the fired article was determined by a wet type chemical analysis, while the presence of tetragonal zirconia and monoclinic zirconia was determined through X-ray diffractometry. The X-ray diffraction measurement was carried out by using an X-ray diffraction device under the conditions of a tube voltage of 50 kv, a tube current of 80 mA, and a scanning speed of 0.25°/min. The presence of the tetragonal zirconia was judged with reference to the diffraction peaks at the faces pf (200), (002), (004) and (220) of the tetragonal $ZrO_2$, whereas the presence of the monoclinic zirconia was judged with reference to the diffraction peaks from the face (111) of the monoclinic $ZrO_2$.

A sheet sample of 0.5×10×100 mm was prepared from the above fired article by using a diamond cutter and a diamond grindstone. A bending stress was imposed upon the sample at a temperature range from room temperature to 1,000° C. The sample was plastically deformed after elastical deformation at a temperature of not higher than 300° C. without being broken. At a temperature of not lower than 400° C., the sample was broken immediately after the elastic deformation, and thus no plastic deformation was attained.

A large volume shrinkage was observed at around 500° C. during temperature elevation in a heat expansion curve of the zirconia sheet sample which had been plastically deformed and curved at not higher than 300° C., and the zirconia sheet sample after the measurement of the heat expansion was restored to its original straight shape, (i.e., before plastic deformation.)

EXAMPLE 2

A time during which the plastic deformation amount of the zirconia article prepared in Example 1 reached 0.5% was measured with the plastic deformation conditions being varied. Results are shown in Table 1. It was discovered that the time period for the plastic deformation was closely correlated to the water content in the atmosphere, and the greater the water content in the atmosphere, the shorter the time for plastic deformation.

EXAMPLE 3

Figure 6:
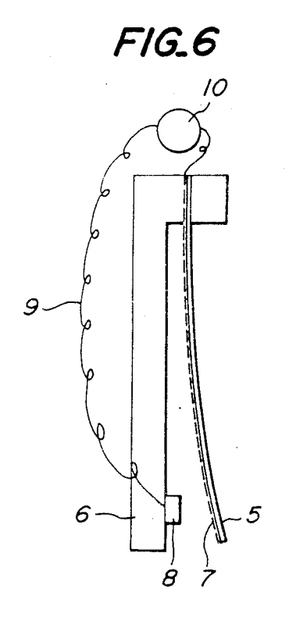
FIG. 6 is a schematic view illustrating a heat safety device.

A sensor of the heat safety device shown in FIG. 6 was prepared by using the zirconia prepared in Example 1. In order to enlarge the plastic deformation amount and the shape restoring amount, a temperature sensitive element was designed as a sheet of 0.5×5×50 mm. After a platinum coating layer 7 was formed on one surface side of the temperature sensitive element 5, a plastic deformation strain was applied to the temperature sensitive element to a warp toward the platinum coating layer side. The deformed temperature sensitive element 5 was attached to a temperature sensitive element support base 6 to which a platinum terminal 8 was fitted. A buzzer 10, the platinum coating layer 7 and the platinum terminal 8 were connected with one another. When the temperature of the temperature sensitive element rose and reached 500° C., the shape of the temperature sensitive element restored its original shape and the rise in the temperature was alarmed by the buzzer 10.

EXAMPLE 4

Figure 7A:
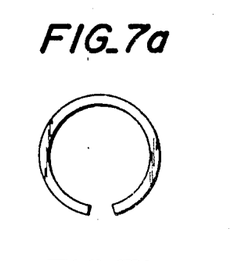
FIGS. 7a and 7b are plan and front views of a flat washer using the ceramic article according to the present invention, respectively.
Figure 7B:
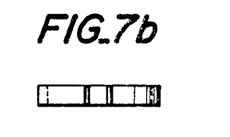

A washer shown in FIGS. 7a and 7b was prepared by using the zirconia prepared in Example 1. A stress was imposed upon the washer at 200° C. at both ends, and the washer was plastically deformed into a shape as shown in FIG. 8b. The thus obtained washer served as a spring washer, and was used in and well stood for the corrosive atmosphere in the state that it was fitted to a bolt and a nut of ceramic.

EXAMPLE 5

Figure 8A:
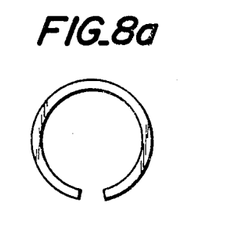
FIGS. 8a and 8b are plan and front views of a spring washer using the ceramic article according to the present invention.
Figure 8B:
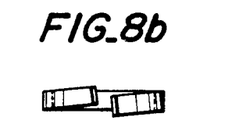

A spring washer as shown in FIGS. 8a and 8b was prepared from the zirconia prepared in Example 1. Next, a stress was imposed upon the spring washer at 200° C. to be plastically deformed as shown in FIGS. 7a and 7b as a flat washer. When this flat washer thus obtained was applied between a bolt and a nut of ceramic, and heated up to 600° C., the flat washer again restored the shape of the spring washer shown in FIGS. 8a and 8b, and it was usable as a spring washer for high temperature use.

EXAMPLE 6

Scissors was prepared from the zirconia prepared in Example 1. A cutting face of the scissors is required to be slightly warped, but it is difficult to finish this warped cutting face by cutting or polishing. Since according to the method of the present invention, the plastic deformation can be perfromed at a low temperature with ease, after the cut face was finished to be flat, it was pressed against a curved mold to be in a concave form. It became possible to easily produce zirconia scissors having a sharp cutting quality.

TABLE 1

| Test No. | Sample | Plastic deformation conditions | | | | | Time Period during which plastic deformation reached 0.5% (hr) |
|---|---|---|---|---|---|---|---|
| | | Atmosphere | Water content in atmosphere (g/l) | Pressure (atm) | Temperature (°C.) | Bending stress (MPa) | |
| 1 | Zirconia ceramic | air | 0.005~0.02 | 1 | 200 | 400 | 3 |
| 2 | composition | " | " | " | 250 | " | 2 |
| 3 | $ZrO_2$: 94.6% by weight | " | " | " | 300 | " | 10 |
| 4 | $Y_2O_3$: 5.4% by weight | autoclave water | 865 | 15 | 200 | " | 0.3 |
| 5 | tetragonal zirconia: | " | 799 | 39 | 250 | " | 0.1 |
| 6 | present | " | 712 | 85 | 300 | " | 0.1 |
| 7 | | autoclave steam | 20 | 39 | 250 | " | 0.5 |

EXAMPLE 7

Figure 9A:
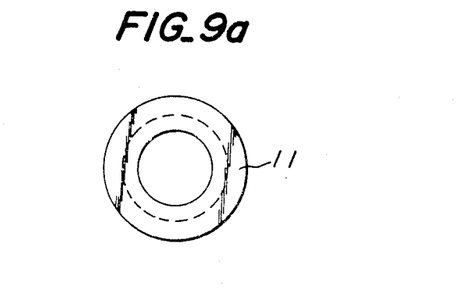
FIGS. 9a, 9b and 9c are plan and front views of a rivet using the ceramic article according to the present invention and a front view of press-in conical jig, respectively.
Figure 9B:
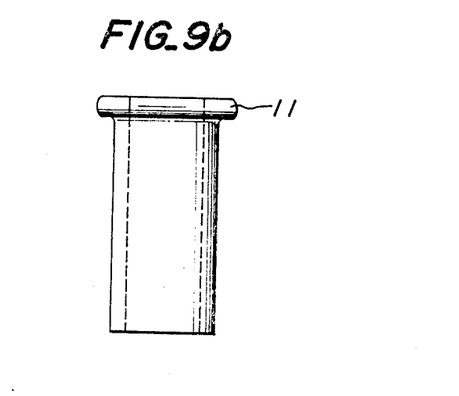
Figure 9C:
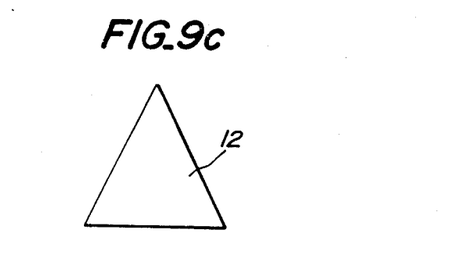

A rivet 11 having a shape shown in FIGS. 9a and 9b was prepared from zirconia containing a solid solution of 5.4% by weight of yttria. Plates made of alumina and silicon nitride were joined together by means of this zirconia rivet. That is, the plate of alumina and the plate of silicon nitride were piled together, and the rivet 11 was inserted into holes preliminarily bored in the plates. Thereafter, the conical member 12, shown in FIG. 9c, was inserted into the rivet from the lower end thereof, and a pressure was applied upon the rivet from the upper and lower ends thereof. The lower straight end portion of the rivet was plastically deformed along the shape of the conical member, so that the two plates were joined together.

EXAMPLE 8

The zirconia tubes 2, 3, 4 shown in FIGS. 3 and 4 having 5.4% by weight of yttria solid solution therein were prepared. The inner diameter of the tube 2 was 99.6 mm, while the outer diameter was 100.0 mm. An inner pressure was applied to the inside of the tube 2 at 200° C. to cause such a plastic deformation strain that the inner diameter of the tube may be 100.4 mm. The tube 2 was heated up to 600° C. in the state that the tubes 3 and 4 were inserted into the tube 2 on its both ends. As shown in FIG. 5, the tubes 3 and 4 were joined together by a restoring force of the tube 2 at which the tube 2 was restored toward the original shape.

As mentioned above, it is possible to easily plastically deform the ceramic article according to the present invention at around room temperature, which has conventionally been considered to be impossible. Since the ceramic article has characteristic of a shape memory effect and the article has excellent heat resistance, corrosion resistance, wear resistance, and mechanical strength. Strength. The article can be used as joint member, temperature sensitive element, valve, washer, energy storage device or the like which are to be used in a high temperature oxidizing atmosphere and a corrosive atmosphere. Thus, the ceramic article according to the present invention can well stand for the circumstances in which the conventional metal shape memory element cannot be used.

Further, according to the present invention, it is possibly to easily perform a plastic deformation upon a portion where a slight warp or twisting is necessary.

In addition, according to the joining method of the invention, it is easy to perform the joining between a metal and ceramic, ceramic and ceramic, and other combination, and the joining method is applicable to any member having an arbitrary shape.

What is claimed is:

1. A method of inducing a shape memory effect in a ceramic article, comprising the steps of bringing a zirconia ceramic article into contact under pressure with a shaping member having a predetermined shape, said zirconia ceramic article comprising as a main component thereof, tetragonal zirconia which is in a thermally metastable phase, subjecting the ceramic article to a temperature of 0° to 400° C. and an external stress of 50 to 3,000 MPa to subject said ceramic article to reversible direction plastic deformation in a reversible direction by utilizing phase transformation from said tetragonal zirconia to a monoclinic zirconia which exists as a stable phase at a temperature of 0 to 400° C., at which temperature the tetragonal zirconia exists as a metastable phase, thereby imparting a shape memory effect in the ceramic article.

2. A method of processing a ceramic article according to claim 1, wherein when the ceramic article is heated to said temperature of 0° to 400° C., the ceramic article is brought into contact under pressure with said shaping member.

3. A method of physically joining a zirconia ceramic article with another article, comprising, contacting under pressure said zirconia ceramic article, which comprises as a main component thereof, tetragonal zirconia which is in a thermally metastable phase, with said another article and heating said zirconia ceramic article to result in phase transformation from said tetragonal zirconia to a monoclinic zirconia which exists as a stable phase at a temperature of 0° to 400° C., thereby resulting in a reversible plastic deformation, said pressure being an external stress of 50 to 3,000 MPa and said heating being performed at a temperature of 0° to 400° C., thereby imparting a shape memory effect in the ceramic article.

4. A method of physically joining a zirconia ceramic article with another member, comprising maintaining the zirconia ceramic article at a temperature of 0° to 400° C., said zirconia ceramic article comprises tetragonal zirconia as a main component thereof, said tetragonal zirconia being in a thermally metastable phase at a temperature of 0° to 400° C., and imparting a stress of 50 to 3,000 MPa upon the zirconia ceramic article to result in phase transformation from said tetragonal zirconia to a monoclinic zirconia which exists as a stable phase at a temperature of 0° to 400° C., so as to bring about a plastic deformation, and further, engaging the thus plastically deformed article with said another member and maintaining the articles thus engaged at a restoring temperature of 400° to 1,400° C., at which temperature the phase before plastic deformation stably exists and at which temperature the phase existing after the plastic deformation exists as a metastable phase, and imparting a restoring stress upon the articles, said stress being an external stress of 50 to 3,000 MPa, which is sufficient to induce phase transformation in a reverse direction from the transformation which occurs during plastic deformation, such that the plastically deformed article is restored to its original shape before any plastic deformation has occurred.

5. The method of claim 4, wherein said element comprises a product selected from the group consisting of a tubular joint member for connecting two tubular-shaped members together, a thermosensitive element, a sensor for use in a heat safety device, a flat washer, a spring washer, a rivet for joining two objects together, a valve and scissors.

6. A method of using a ceramic shape memory element comprising:
   providing a ceramic shape memory element having, as a main component thereof, tetragonal zirconia which is in a thermally metastable phase; and
   maintaining the ceramic shape memory element at a temperature from 0° C. to 400° C. and subjecting the element to an external stress of 50 to 3,000 MPa to induce a reversible plastic deformation of said ceramic shape memory element;
   wherein said reversible plastic deformation is induced by utilizing phase transformation from said tetragonal zirconia to a monoclinic zirconia which exists as stable phase at a temperature of 0° C. to 400° C. and at which temperature the tetragonal zirconia exists as a metastable phase.

7. The method of claim 6, wherein said memory element contains at least 5% by weight of zirconia.

8. The method of claim 6, wherein said memory element contains at least 50% by weight of zirconia.

9. The method of claim 6, wherein said phase transformation occurs under an atmosphere containing not less than 0.08 g/l of water.

10. The method of claim 6, wherein said phase transformation occurs under an atmosphere containing not less than 2.5 g/l of water.

11. The method of claim 6, further comprising the step of subjecting the ceramic shape memory element, when in its plastically deformed state, to conditions sufficient to return said element to its original non-plastically deformed shape.

12. A method of using a ceramic shape memory element comprising:
prov14ing a ceramic shape memory element having, as a main component thereof, tetragonal zirconia which is in a thermally metastable phase;
maintaining the ceramic shape memory element at a temperature from 0° C. to 400° C. and subjecting the element to an external stress of 50 to 3,000 MPa to induce a reversible plastic deformation of said ceramic shape memory element, wherein said reversible plastic deformation is induced by utilizing phase transformation from said tetragonal zirconia to a monoclinic zirconia which exists as a stable phase at a temperature of 0° C. to 400° C. and at which temperature the tetragonal zirconia exists as a metastable phase; and
subjecting the plastically deformed element to a temperature between 400° C. to 1400° C. to allow the plastically deformed element to restore to its original non-plastically deformed shape;
wherein the restoration of the plastically deformed element to its original non-plastically deformed shape is induced by utilizing phase transformation from said monoclinic zirconia to tetragonal zirconia which exists as a stable phase at a temperature of 400° C. to 1400° C. and at which temperature the monoclinic zirconia exists as a metastable phase.

13. The method of claim 12, wherein said memory element contains at least 5% by weight of zirconia.

14. The method of claim 12, wherein said memory element contains at least 50% by weight of zirconia.

15. The method of claim 12, wherein said phase transformation occurs under an atmosphere containing not less than 0.08 g/1 of water.

16. The method of claim 12, wherein said phase transformation occurs under at atmosphere containing not less than 2.5 g/1 of water.

17. The method of claim 12, wherein said element comprises a product selected from the group consisting of a tubular joint member for connecting two tubular-shaped members together, a thermosensitive element, a sensor for use in a heat safety device, a flat washer, a spring washer, a rivet for joining two object together, a valve and scissors.

* * * * *